(12) United States Patent
Thompson

(10) Patent No.: US 12,395,806 B2
(45) Date of Patent: Aug. 19, 2025

(54) OBJECT-BASED AUDIO SPATIALIZER

(71) Applicant: Nintendo Co., Ltd., Kyoto (JP)

(72) Inventor: Jeff Thompson, Sammamish, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 18/424,295

(22) Filed: Jan. 26, 2024

(65) Prior Publication Data

US 2024/0171928 A1 May 23, 2024

Related U.S. Application Data

(63) Continuation of application No. 17/513,249, filed on Oct. 28, 2021, now Pat. No. 11,924,623.

(51) Int. Cl.
*H04S 7/00* (2006.01)
*A63F 13/54* (2014.01)
*A63F 13/814* (2014.01)

(52) U.S. Cl.
CPC ............... *H04S 7/30* (2013.01); *A63F 13/54* (2014.09); *A63F 13/814* (2014.09); *H04S 2400/01* (2013.01); *H04S 2420/01* (2013.01)

(58) Field of Classification Search
CPC .... H04S 7/30; H04S 2400/01; H04S 2420/01; H04S 7/303; H04S 2400/11; H04S 2400/15; H04S 2420/07; H04S 7/304; A63F 13/54; A63F 13/814
See application file for complete search history.

(56) References Cited

U.S. PATENT DOCUMENTS

| | | | |
|---|---|---|---|
| 5,384,856 A | 1/1995 | Kyouno | |
| 7,338,373 B2 | 3/2008 | Kawamura | |
| 9,237,398 B1 | 1/2016 | Algazi | |
| 9,301,076 B2 | 3/2016 | Mizuta | |
| 9,338,577 B2 | 5/2016 | Mizuta | |
| 9,753,537 B2 | 9/2017 | Obana et al. | |
| 9,833,702 B2 | 12/2017 | Obana et al. | |
| 9,968,846 B2 | 5/2018 | Obana et al. | |
| 10,135,412 B2 | 11/2018 | Obana et al. | |
| 10,286,310 B2 | 5/2019 | Obana et al. | |
| 10,796,540 B2 | 10/2020 | Obana et al. | |
| 2006/0045294 A1 | 3/2006 | Smyth | |
| 2013/0041648 A1 | 2/2013 | Osman | |
| 2020/0368616 A1* | 11/2020 | Delamont | H04N 13/239 |
| 2021/0168553 A1* | 6/2021 | Brown | H04S 5/02 |
| 2021/0383788 A1* | 12/2021 | Hashimoto | G10K 15/12 |
| 2023/0283980 A1* | 9/2023 | Norris | H04S 1/007 |
| | | | 381/1 |

(Continued)

OTHER PUBLICATIONS

Middlebrooks et al, "Sound localization by human listeners", 42:135-59 Annu Rev Psychol (1991); doi: 10.1146/annurev.ps.42.020191.001031 (not enclosed).

(Continued)

*Primary Examiner* — Phung-Hoang J Nguyen
(74) *Attorney, Agent, or Firm* — Nixon & Vanderhye P.C.

(57) ABSTRACT

A 3D sound spatializer provides delay-compensated HRTF interpolation techniques and efficient cross-fading between current and delayed HRTF filter results to mitigate artifacts caused by interpolation between HRTF filters and the use of time-varying HRTF filters.

19 Claims, 12 Drawing Sheets
(5 of 12 Drawing Sheet(s) Filed in Color)

(56) References Cited

U.S. PATENT DOCUMENTS

2023/0379650 A1* 11/2023 Lee .................... G06V 10/752

OTHER PUBLICATIONS https://developer.oculus.com/resources/audio-intro-localization/.

Fa. P.. Freeland, Lu. P.. Biscainho, and PA. R.. Diniz, "Efficient HRTF Interpolation in 3D Moving Sound", Paper 000232, (Jun. 2002.) (Year: 2002).

F. Brinkmann, and S. Weinzierl, "Comparison of Head-Related Transfer Functions Pre-Processing Techniques for Spherical Harmonics Decomposition", Paper P9-3, (Aug. 2018.) (Year: 2018).

Jo. M.. Arend, F. Brinkmann, and C. Porschmann, "Assessing Spherical Harmonics Interpolation of Time-Aligned Head-Related Transfer Functions", J. Audio Eng. Soc., vol. 69, No. 1/2, pp. 104-117, (Jan. 2021.). doi: https://doi.org/10.17743/jaes.2020.0070 (Year: 2021).

* cited by examiner

OBJECT-BASED AUDIO SPATIALIZER

CROSS-REFERENCE TO RELATED APPLICATIONS

This application is a continuation of U.S. patent application Ser. No. 17/513,249, filed Oct. 28, 2021, now U.S. Pat. No. 11/924,623. This application is related to U.S. application Ser. No. 17/513,175, filed Oct. 28, 2021, now U.S. Pat. No. 11,665,498. These applications are incorporated herein by reference in their entirety and for all purposes.

FIELD

The technology herein relates to 3D audio, and more particularly to signal processing techniques for improving the quality and accuracy of virtual 3D object placement in a virtual sound generating system for augmented reality, video games and other applications.

BACKGROUND

Even though we only have two ears, we humans are able to detect with remarkable precision the 3D position of sources of sounds we hear. Sitting on the back porch on a summer night, we can hear cricket sounds from the left, frog sounds from the right, the sound of children playing behind us, and distant thunder from far away in the sky beyond the horizon. In a concert hall, we can close our eyes and hear that the violins are on the left, the cellos and double basses are on the right with the basses behind the cellos, the winds and violas are in the middle with the woodwinds in front, the brasses in back and the percussion behind them.

Some think we developed such sound localization abilities because it was important to our survival—perceiving a sabre tooth tiger rustling in the grass to our right some distance away but coming toward us allowed us to defend ourselves from attack. Irrespective of how and why we developed this remarkable ability to perceive sound localization, it is part of the way we perceive the world. Therefore, when simulating reality with a virtual simulation such as a video game (including first person or other immersive type games), augmented reality, virtual reality, enhanced reality, or other presentations that involve virtual soundscapes and/or 3D spatial sound, it has become desirable to model and simulate sound sources so we perceive them as having realistic spatial locations in three dimensional space.

Lateral Localization

It is intuitive that sounds we hear mostly with our left ear are coming from our left, and sounds we hear mostly with our right ear are coming from our right. A simple stereo pan control uses variable loudness levels in left and right headphone speakers to create the illusion that a sound is towards the left, towards the right, or in the center.

The psychoacoustic mechanisms we use for detecting lateral or azimuthal localization are actually much more complicated than simple stereo intensity panning. Our brains are capable of discerning fine differences in both the amplitude and the timing (phase) of sounds detected by our ears. The relative delay between the time a sound arrives at our left ear versus the time the same sound arrives at our right ear is called the interaural time difference or ITD. The difference in amplitude or level between a sound detected by our left ear versus the same sound detected by our right ear is called the interaural level difference or ILD. Our brains use both ILD and ITD for sound localization.

It turns out that one or the other (ILD or ITD) is more useful depending on the characteristics of a particular sound. For example, because low frequency (low pitched) sounds have wavelengths that are greater than the dimensions of our heads, our brains are able to use phase (timing difference) information to detect lateral direction of low frequency or deeper pitched sounds. Higher frequency (higher pitched) sounds on the other hand have shorter wavelengths, so phase information is not useful for localizing sound. But because our heads attenuate higher frequency sounds more readily, our brains use this additional information to determine the lateral location of high frequency sound sources. In particular, our heads "shadow" from our right ear those high frequency sounds originating from the left side of our head, and "shadow" from our left ear those high frequency sounds originating from the right side of our head. Our brains are able to detect the minute differences in amplitude/level between our left and right ears based on such shadowing to localize high frequency sounds. For middle frequency sounds there is a transition region where both phase (timing) and amplitude/level differences are used by our brains to help us localize the sound.

Elevation and Front-to-Back Localization

Discerning whether a sound is coming from behind us or in front of us is more difficult. Think of a sound source directly in front of us, and the same sound directly behind us. The sounds the sound source emanates will reach our left and right ears at exactly the same time in either case. Is the sound in front of us, or is it behind us? To resolve this ambiguity, our brains rely on how our ears, heads and bodies modify the spectra of sounds. Sounds originating from different directions interact with the geometry of our bodies differently. Sound reflections caused by the shape and size of our head, neck, shoulders, torso, and especially, by the outer ears (or pinnae) act as filters that modify the frequency spectrum of the sound that reaches our eardrums.

Our brains use these spectral modifications to infer the direction of the sound's origin. For example, sounds approaching from the front produce resonances created by the interior complex folds of our pinnae, while sounds from the back are shadowed by our pinnae. Similarly, sounds from above may reflect off our shoulders, while sounds from below are shadowed by our torso and shoulders. These reflections and shadowing effects combine to allow our brains to apply what is effectively a direction-selective filter.

Audio Spatialization Systems

Since the way our heads modify sounds is key to the way our brains perceive the direction of the sounds, modern 3D audio systems attempt to model these psychoacoustic mechanisms with head-related transfer functions (HRTFs). A HRTF captures the timing, level, and spectral differences that our brains use to localize sound and is the cornerstone of most modern 3D sound spatialization techniques.

A HRTF is the Fourier transform of the corresponding head-related impulse response (HRIR). Binaural stereo channels $y_L(t)$ and $y_R(t)$ are created (see FIG. 5) by convolving a mono object sound $x(t)$ with a HRIR for each ear $h_L(t)$ and $h_R(t)$. This process is performed for each of the M sound objects (FIG. 5 shows three different sound objects but there can be any number M), each sound object representing or modeling a different sound source in three-dimensional virtual space. Equivalently, the convolution can be performed in the frequency-domain by multiplying a mono object sound $X(f)$ with each HRTF $H_L(f)$ and $H_R(f)$, i.e., $$Y_L(f) = X(f) H_L(f)$$

$$Y_R(f) = X(f) H_R(f)$$

The binaural method, which is a common type of 3D audio effect technology that typically employs headphones worn by the listener, uses the HRTF of sounds from the sound sources to both ears of a listener, thereby causing the listener to recognize the directions from which the sounds apparently come and the distances from the sound sources. By applying different HRTFs for the left and right ear sounds in the signal or digital domain, it is possible to fool the brain into believing the sounds are coming from real sound sources at actual 3D positions in real 3D space.

For example, using such a system, the sound pressure levels (gains) of sounds a listener hears change in accordance with frequency until the sounds reach the listener's eardrums. In 3D audio systems, these frequency characteristics are typically processed electronically using a HRTF that takes into account not only direct sounds coming directly to the eardrums of the listener, but also the influences of sounds diffracted and reflected by the auricles or pinnae, other parts of the head, and other body parts of the listener—just as real sounds propagating through the air would be.

The frequency characteristics also vary depending on source locations (e.g., the azimuth orientations). Further, the frequency characteristics of sounds to be detected by the left and right ears may be different. In spatial sound systems, the frequency characteristics of, sound volumes of, and time differences between, the sounds to reach the left and right eardrums of the listener are carefully controlled, whereby it is possible to control the locations (e.g., the azimuth orientations) of the sound sources to be perceived by the listener. This enables a sound designer to precisely position sound sources in a soundscape, creating the illusion of realistic 3D sound. See for example U.S. Pat. No. 10,796,540B2; Sodnik et al., "Spatial sound localization in an augmented reality environment", OZCHI '06: Proceedings of the 18th Australia conference on Computer-Human Interaction: Design: Activities, Artefacts and Environments (November 2006) Pages 111-118https://doi.org/10.1145/1228175.1228197; Immersive Sound: The Art and Science of Binaural and Multi-Channel Audio (Routledge 2017).

While much work has been done in the past, further improvements are possible and desirable.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF NON-LIMITING EMBODIMENTS

Figure 1:
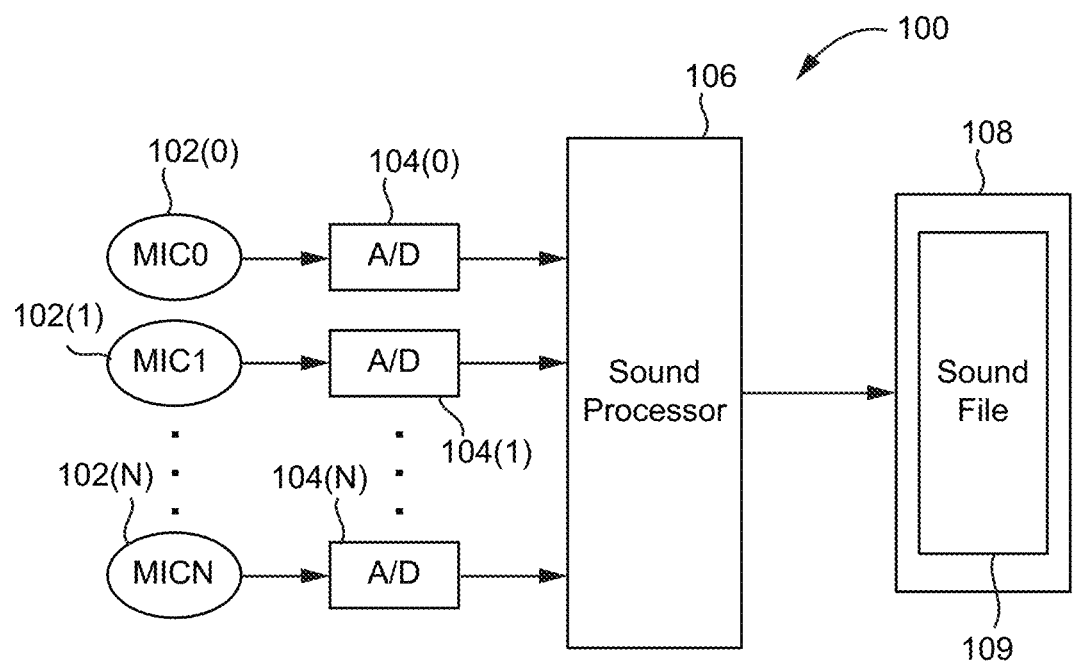
FIG. 1 is a block schematic diagram of an example sound capture system.

A new object-based spatializer algorithm and associated sound processing system has been developed to demonstrate a new spatial audio solution for virtual reality, video games, and other 3D audio spatialization applications. The spatializer algorithm processes audio objects to provide a convincing impression of virtual sound objects emitted from arbitrary positions in 3D space when listening over headphones or in other ways.

The object-based spatializer applies head-related transfer functions (HRTFs) to each audio object, and then combines all filtered signals into a binaural stereo signal that is suitable for headphone or other playback. With a high-quality HRTF database and novel signal processing, a compelling audio playback experience can be achieved that provides a strong sense of externalization and accurate object localization.

Example Features

The following are at least some exemplary features of the object-based spatializer design:
  Spatializes each audio object independently based on object position
  Supports multiple (M) simultaneous objects
  Object position can change over time
  Reasonable CPU load (e.g., through the use of efficient FFT-based convolution or other techniques)
  Novel delay-compensated HRTF interpolation technique
  Efficient cross-fading technique to mitigate artifacts caused by time-varying HRTF filters Example Sound Capture System The object-based spatializer can be used in a video game system, artificial reality system (such as, for example, an augmented or virtual reality system), or other system with or without a graphics or image based component, to provide a realistic soundscape comprising any number M of sound objects. The soundscape can be defined in a three-dimensional (xyz) coordinate system. Each of plural (M) artificial sound objects can be defined within the soundscape. For example, in a forest soundscape, a bird sound object high up in a tree may be defined at one xyz position (e.g., as a point source), a waterfall sound object could be defined at another xyz position or range of positions (e.g., as an area source), and the wind blowing through the trees could be defined as a sound object at another xyz position or range of positions (e.g., another area source). Each of these objects may be modeled separately. For example, the bird object could be modeled by capturing the song of a real bird, defining the xyz virtual position of the bird object in the soundscape, and (in advance or during real time playback) processing the captured sounds through a HRTF based on the virtual position of the bird object and the position (and in some cases the orientation) of the listener's head. Similarly, the sound of the waterfall object could be captured from a real waterfall, or it could be synthesized in the studio. The waterfall object could be modeled by defining the xyz virtual position of the waterfall object in the soundscape (which might be a point source or an area source depending on how far away the waterfall object is from the listener). And (in advance or during real time playback) processing the captured sounds through a HRTF based on the virtual position of the waterfall and the position (and in some cases the orientation) of the listener's head. Any number M of such sound objects can be defined in the soundscape.

At least some of the sound objects can have a changeable or dynamic position (e.g., the bird could be modeled to fly from one tree to another). In a video game or virtual reality, the positions of the sound objects can correspond to positions of virtual (e.g., visual or hidden) objects in a 3D graphics world so that the bird for example could be modeled by both a graphics object and a sound object at the same apparent virtual location relative to the listener. In other applications, no graphics component need be present.

Figure 1A:
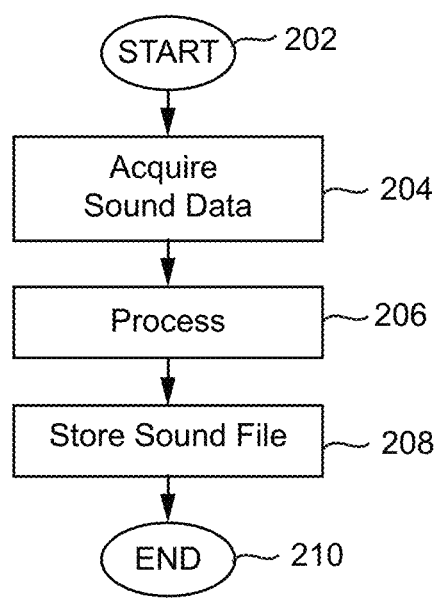
FIG. 1A is a flowchart of example program control steps performed by the FIG. 1 system.

To model a sound object, the sound of the sound source (e.g., bird song, waterfall splashes, blowing wind, etc.) is first captured from a real world sound or artificial synthesized sound. In some instances, a real world sound can be digitally modified, e.g., to apply various effects (such as making a voice seem higher or lower), remove unwanted noise, etc. FIG. 1 shows an example system 100 used to capture sounds for playback. In this example, any number of actual and/or virtual microphones 102 are used to capture a sound (FIG. 1A blocks 202, 204). The sounds are digitized by an A/D converter 104 and may be further processed by a sound processor 106 (FIG. 1A block 206) before being stored as a sound file 109 (FIG. 1A blocks 208, 210). Any kind of sound can be captured in this way—birds singing, waterfalls, jet planes, police sirens, wind blowing through grass, human singers, voices, crowd noise, etc. In some cases, instead of or in addition to capturing naturally occurring sounds, synthesizers can be used to create sounds such as sound effects. The resulting collection or library of sound files 109 can be stored (FIG. 1A block 208) and used to create and present one or more sound objects in a virtual 3D soundscape. Often, a library of such sounds are used when creating content. Often, the library defines or uses monophonic sounds for each object, which are then manipulated as described below to provide spatial effects.

Figure 2:
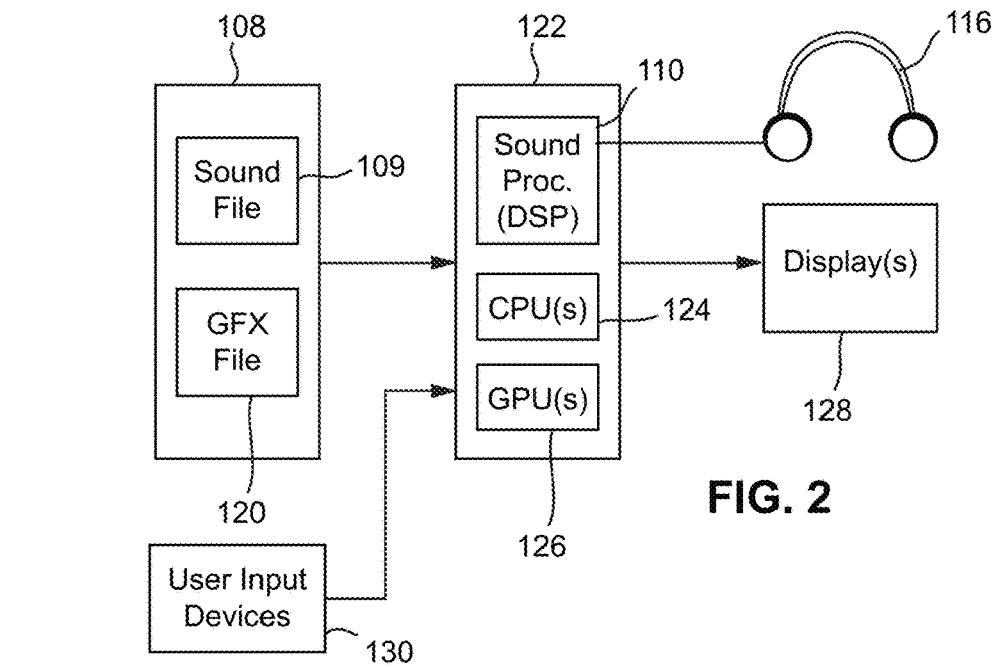
FIG. 2 is a block diagram of an example sound and graphics generating system.

FIG. 2 shows an example non-limiting sound spatializing system including visual as well as audio capabilities. In the example shown, a non-transient storage device 108 stores sound files 109 and graphics files 120. A processing system 122 including a sound processor 110, a CPU 124, and a graphics processing unit 126 processes the stored information in response to inputs from user input devices 130 to provide binaural 3D audio via stereo headphones 116 and 3D graphics via display 128. Display 128 can be any kind of display such as a television, computer monitor, a handheld display (e.g., provided on a portable device such as a tablet, mobile phone, portable gaming system, etc.), goggles, eye glasses, etc. Similarly, headphones provide an advantage of offering full control over separate sound channels that reach each of the listener's left and right ears, but in other applications the sound can be reproduced via loudspeakers (e.g., stereo, surround-sound, etc.) or other transducers in some embodiments. Such a system can be used for real time interactive playback of sounds, or for recording sounds for later playback (e.g., via podcasting or broadcasting), or both. In such cases, the virtual and relative positions of the sound objects and the listener may be fixed or variable. For example, in a video game or virtual reality scenario, the listener may change the listener's own position in the soundscape and may also be able to control the positions of certain sound objects in the soundscape (in some embodiments, the listener position corresponds to a viewpoint used for 3D graphics generation providing a first person or third person "virtual camera" position, see e.g., U.S. Pat. No. 5,754,660). Meanwhile, the processing system may move or control the position of other sound objects in the soundscape autonomously ("bot" control). In a multiplayer scenario, one listener may be able to control the position of some sound objects, and another listener may be able to control the position of other sound objects. In such movement scenarios, the sound object positions are continually changing relative to the positions of the listener's left and right ears. However, example embodiments include but are not limited to moving objects. For example, sound generating objects can change position, distance and/or direction relative to a listener position without being perceived or controlled to "move" (e.g., use of a common sound generating object to provide multiple instances such as a number of songbirds in a tree or a number of thunderclaps from different parts of the sky).

Figure 3:
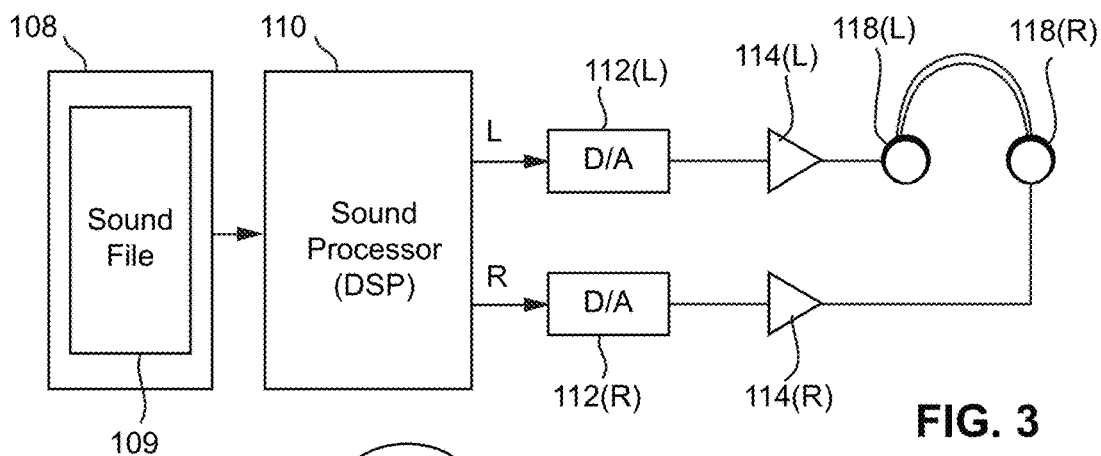
FIG. 3 is a block diagram of an example sound generating system portion of the FIG. 2 system.

FIG. 3 shows an example non-limiting more detailed block diagram of a 3D spatial sound reproduction system. In the example shown, sound processor 110 generates left and right outputs that it provides to respective digital to analog converters 112(L), 112(R). The two resulting analog channels are amplified by analog amplifiers 114(L), 114(R), and provided to the respective left and right speakers 118(L), 118(R) of headphones 116. The left and right speakers 118(L), 118(R) of headphones 116 vibrate to produce sound waves which propagate through the air and through conduction. These sound waves have timings, amplitudes and frequencies that are controlled by the sound processor 110. The sound waves impinge upon the listener's respective left and right eardrums or tympanic membranes. The eardrums vibrate in response to the produced sound waves, the vibration of the eardrums corresponding in frequencies, timings and amplitudes specified by the sound processor 110. The human brain and nervous system detect the vibrations of the eardrums and enable the listener to perceive the sound, using the neural networks of the brain to perceive direction and distance and thus the apparent spatial relationship between the virtual sound object and the listener's head, based on the frequencies, amplitudes and timings of the vibrations as specified by the sound processor 110.

Figure 4:
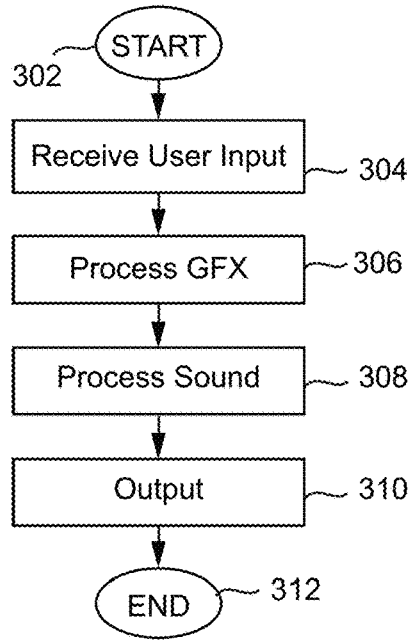
FIG. 4 is a flowchart of example program control steps performed by the FIG. 2 system.

FIG. 4 shows an example non-limiting system flowchart of operations performed by processing system 122 under control of instructions stored in storage 108. In the example shown, processing system 122 receives user input (blocks 302, 304), processes graphics data (block 306), processes sound data (block 308), and generates outputs to headphones 116 and display 128 (block 310, 312). In one embodiment, this program controlled flow is performed periodically such as once every video frame (e.g., every $\frac{1}{60}^{th}$ or $\frac{1}{30}^{th}$ of a second, for example). Meanwhile, sound processor 110 may process sound data (block 308) many times per video frame processed by graphics processor 126. In one embodiment, an application programming interface (API) is provided that permits the CPU 124 to (a) (re)write relative distance, position and/or direction parameters (e.g., one set of parameters for each sound generating object) into a memory accessible by a digital signal, audio or sound processor 110 that performs sound data (block 308), and (b) call the digital signal, audio or sound processor 110 to perform sound processing on the next blocks or "frames" of audio data associated with sounds produced by a sound generating object(s) that the CPU 124 deposits and/or refers to in main or other shared memory accessible by both the CPU 124 and the sound processor 110. The digital signal, audio or sound processor 110 may thus perform a number of sound processing operations each video frame for each of a number of localized sound generating objects to produce a multiplicity of audio output streams that it then mixes or combines together and with other non- or differently processed audio streams (e.g., music playback, character voice playback, non-localized sound effects such as explosions, wind sounds, etc.) to provide a composite sound output to the headphones that includes both localized 3D sound components and non-localized (e.g., conventional monophonic or stereophonic) sound components.

HRTF-Based Spatialization

In one example, the sound processor 110 uses a pair of HRTF filters to capture the frequency responses that characterize how the left and right ears receive sound from a position in 3D space. Processing system 122 can apply different HRTF filters for each sound object to left and right sound channels for application to the respective left and right channels of headphones 116. The responses capture important perceptual cues such as Interaural Time Differences (ITDs), Interaural Level Differences (ILDs), and spectral deviations that help the human auditory system localize sounds as discussed above.

In many embodiments using multiple sound objects and/or moving sound objects, the filters used for filtering sound objects will vary depending on the location of the sound object(s). For example, the filter applied for a first sound object at $(x_1, y_1, z_1)$ will be different than a filter applied to a second sound object at $(x_2, y_2, z_2)$. Similarly, if a sound object moves from position $(x_1, y_1, z_1)$ to position $(x_2, y_2, z_2)$, the filter applied at the beginning of travel will be different than the filter applied at the end of travel. Furthermore, if sound is produced from the object when it is moving between those two positions, different corresponding filters should be applied to appropriately model the HRTF for sound objects at such intermediate positions. Thus, in the case of moving sound objects, the HRTF filtering information may change over time. Similarly, the virtual location of the listener in the 3D soundscape can change relative to the sound objects, or positions of both the listener and the sound objects can be moving (e.g., in a simulation game in which the listener is moving through the forest and animals or enemies are following the listener or otherwise changing position in response to the listener's position or for other reasons). Often, a set of HRTFs will be provided at predefined locations relative to the listener, and interpolation is used to model sound objects that are located between such predefined locations. However, as will be explained below, such interpolation can cause artifacts that reduce realism.

Example Architecture

Figure 6:
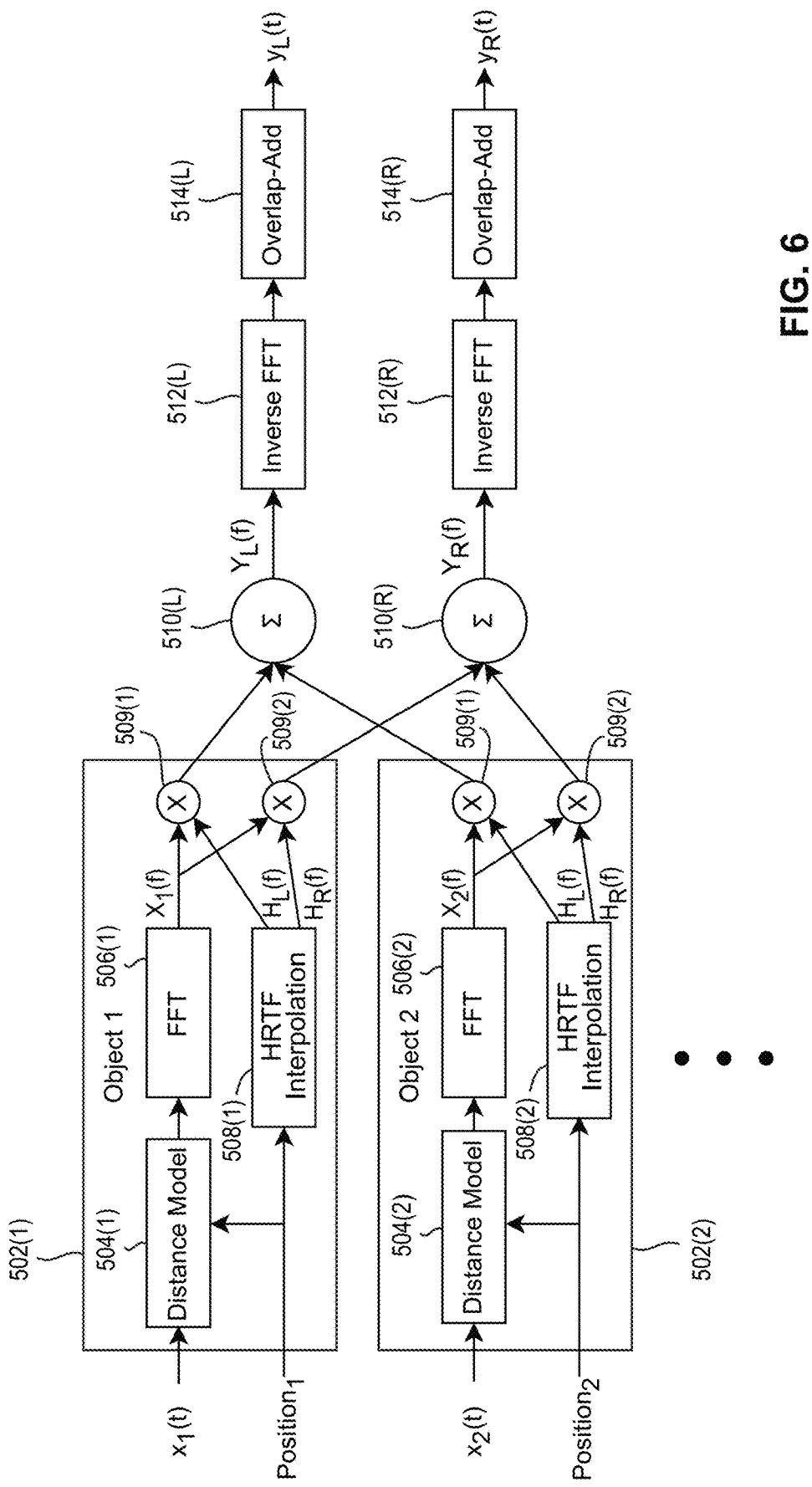
FIG. 6 is a block diagram of an example object-based spatializer architecture that can be incorporated into the systems of FIGS. 2 and 3.

FIG. 6 is a high-level block diagram of an object-based spatializer architecture. A majority of the processing is performed in the frequency-domain, including efficient FFT-based convolution, in order to keep processing costs as low as possible.

Per-Object Processing

The first stage of the architecture includes a processing loop 502 over each available audio object. Thus, there may be M processing loops 502(1), . . . , 502(M) for M processing objects (for example, one processing loop for each sound object). Each processing loop 502 processes the sound information (e.g., audio signal x(t)) for a corresponding object based on the position of the sound object (e.g., in xyz three dimensional space). Both of these inputs can change over time. Each processing loop 502 processes an associated sound object independently of the processing other processing loops are performing for their respective sound objects. The architecture is extensible, e.g., by adding an additional processing loop block 502 for each additional sound object. In one embodiment, the processing loops 502 are implemented by a DSP performing software instructions, but other implementations could use hardware or a combination of hardware and software.

The per-object processing stage applies a distance model 504, transforms to the frequency-domain using an FFT 506, and applies a pair of digital HRTF FIR filters based on the unique position of each object (because the FFT 506 converts the signals to the frequency domain, applying the digital filters is a simple multiplication indicated by the "X" circles 509 in FIG. 6) (multiplying in the frequency domain is the equivalent of performing convolutions in the time domain, and it is often more efficient to perform multiplications with typical hardware than to perform convolutions).

In one embodiment, all processed objects are summed into internal mix buses $Y_L(f)$ and $Y_R(f)$ 510(L), 510(R). These mix buses 510(L), 510(R) accumulate all of the filtered signals for the left ear and the right ear respectively. In FIG. 6, the summation of all filtered objects to binaural stereo channels is performed in the frequency-domain. Internal mix buses $Y_L(f)$ and $Y_R(f)$ 510 accumulate all of the filtered objects:

$$Y_L(f) = \sum_{i=1}^{M} X_i(f) H_{i,L}(f)$$

$$Y_R(f) = \sum_{i=1}^{M} X_i(f) H_{i,R}(f)$$

where M is the number of audio objects.

Inverse FFT and Overlap-Add

Figure 5:
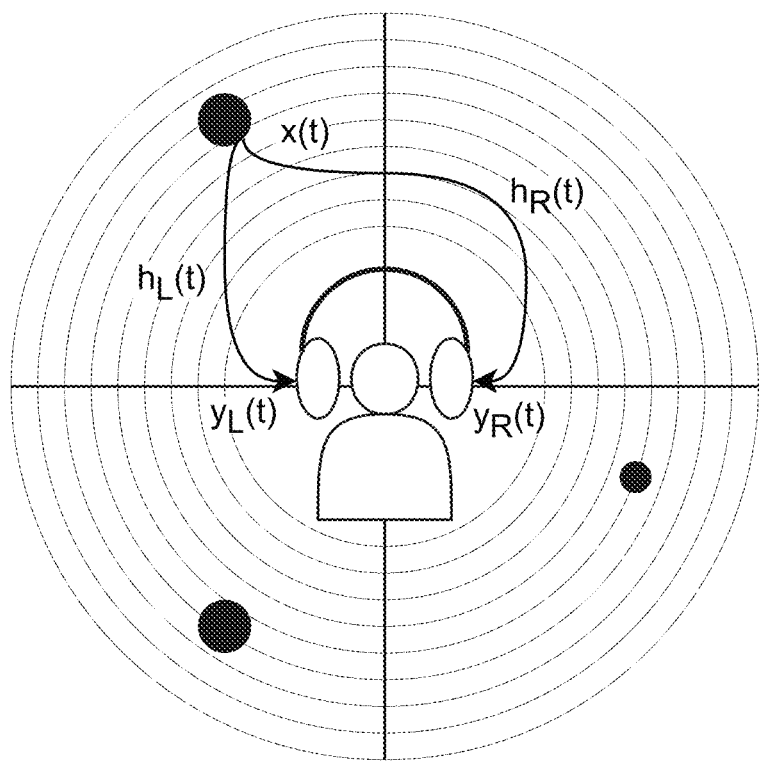
FIG. 5 shows example spatialization parameters.
Figure 11:
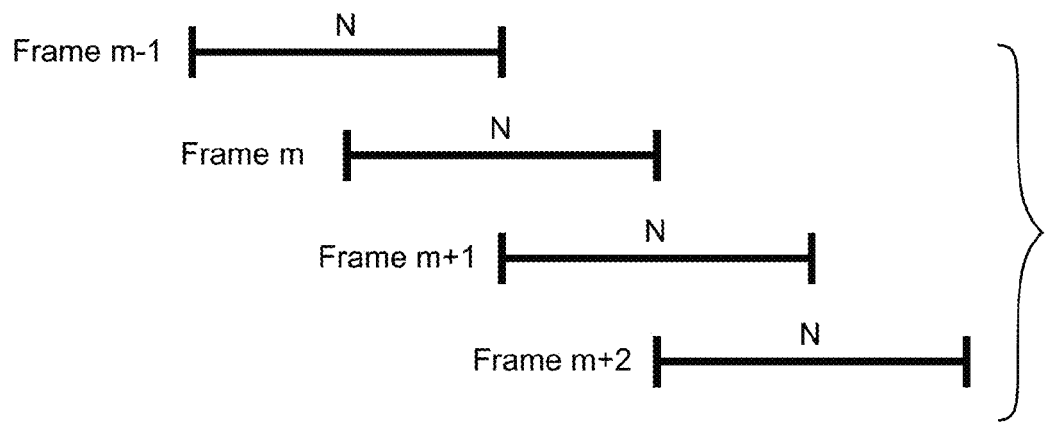
FIG. 11 shows frame time windows.

These summed signals are converted back to the time domain by inverse FFT blocks 512(L), 512(R) and overlap-add processes 514(L), 514(R) provide an efficient way to implement convolution of very long signals (see e.g., Oppenheim, et al. Digital signal processing (Prentice-Hall 1975), ISBN 0-13-214635-5; and Hayes, et al. Digital Signal Processing. Schaum's Outline Series (McGraw Hill 1999), ISBN 0-07-027389-8. The output signals $y_L(t)$, $y_R(t)$ (see FIG. 5) may then be converted to analog, amplified, and applied to audio transducers at the listeners ears. As FIG. 6 shows, an inverse FFT 512 is applied to each of the internal mix buses $Y_L(f)$ and $Y_R(f)$. The forward FFTs for each object were zero-padded by a factor of 2 resulting in a FFT length of N. Valid convolution can be achieved via the common overlap-add technique with 50% overlapping windows as FIG. 11 shows, resulting in the final output channels $y_L(t)$ and $y_R(t)$.

Distance Model 504

Each object is attenuated using a distance model 504 that calculates attenuation based on the relative distance between the audio object and the listener. The distance model 504 thus attenuates the audio signal x(t) of the sound object based on how far away the sound object is from the listener. Distance model attenuation is applied in the time-domain and includes ramping from frame-to-frame to avoid discontinuities. The distance model can be configured to use linear and/or logarithmic attenuation curves or any other suitable distance attenuation function. Generally speaking, the distance model 504 will apply a higher attenuation of a sound x(t) when the sound is travelling a further distance from the object to the listener. For example attenuation rates may be affected by the media through which the sound is travelling (e.g., air, water, deep forest, rainscapes, etc.).

FFT 506

In one embodiment, each attenuated audio object is converted to the frequency-domain via a FFT 506. Converting into the frequency domain leads to a more optimized filtering implementation in most embodiments. Each FFT 506 is zero-padded by a factor of 2 in order to prevent circular convolution and accommodate an FFT-based overlap-add implementation.

HRTF Interpolation 508

For a convincing and immersive experience, it is helpful to achieve a smooth and high-quality sound from any position in 3D space. It is common that digital HRTF filters are defined for pre-defined directions that have been captured in the HRTF database. Such a database may thus provide a lookup table for HRTF parameters for each of a number of xyz locations in the soundscape coordinate system (recall that distance is taken care of in one embodiment with the distance function). When the desired direction for a given object does not perfectly align with a pre-defined direction (i.e., vector between a sound object location and the listener location in the soundscape coordinate system) in the HRTF database, then interpolation between HRTF filters can increase realism.

HRTF Bilinear Interpolation

Figure 7:
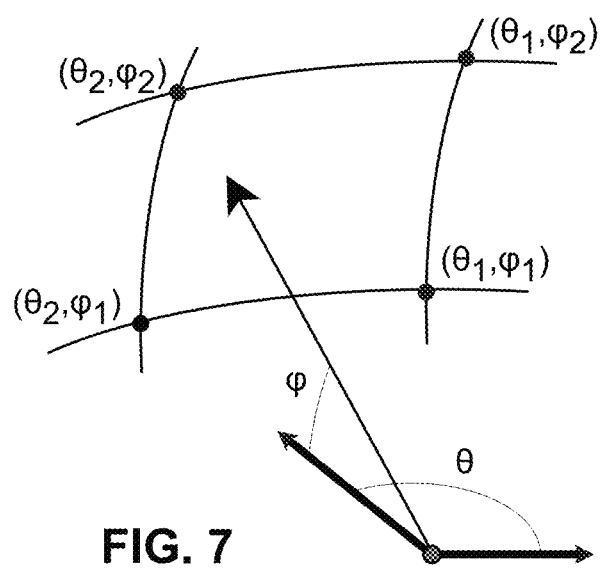
FIG. 7 shows an example spatialization interpolation region.

The HRTF interpolation is performed twice, using different calculations for the left ear and the right ear. FIG. 7 shows an example of a region of soundscape space (here represented in polar or spherical coordinates) where filters are defined at the four corners of the area (region) and the location of the sound object and/or direction of the sound is defined within the area/region. In FIG. 7, the azimuth represents the horizontal dimension on the sphere, and the elevation represents the vertical dimension on the sphere. One possibility is to simply take the nearest neighbor—i.e., use the filter defined at the corner of the area that is nearest to the location of the sound object. This is very efficient as it requires no computation. However, a problem with this approach is that it creates perceivably discontinuous filter functions. If the sound object is moving within the soundscape, the sound characteristics will be heard to "jump" from one set of filter parameters to another, creating perceivable artifacts.

A better technique for interpolating HRTFs on a sphere is to use a non-zero order interpolation approach. For example, bilinear interpolation interpolates between the four filters defined at the corners of the region based on distance for each dimension (azimuth and elevation) separately.

Let the desired direction for an object be defined in spherical coordinates by azimuth angle $\theta$ and elevation angle $\varphi$. Assume the desired direction points into the interpolation region defined by the four corner points $(\theta_1, \varphi_1)$, $(\theta_1, \varphi_2)$, $(\theta_2, \varphi_1)$, and $(\theta_2, \varphi_2)$ with corresponding HRTF filters $H_{\theta_1,\varphi_1}(f)$, $H_{\theta_1,\varphi_2}(f)$, $H_{\theta_2,\varphi_1}(f)$, and $H_{\theta_2,\varphi_2}(f)$. Assume $\theta_1 < \theta_2$ and $\varphi_1 < \varphi_2$ and $\theta_1 \leq \theta \leq \theta_2$ and $\varphi_1 \leq \varphi \leq \varphi_2$. FIG. 7 illustrates the scenario.

The interpolation determines coefficients for each of the two dimensions (azimuth and elevation) and uses the coefficients as weights for the interpolation calculation. Let $\alpha_\theta$ and $\alpha_\varphi$ be linear interpolation coefficients calculated separately in each dimension as:

$$\alpha_\theta = \frac{\theta - \theta_1}{\theta_2 - \theta_1}$$

$$\alpha_\varphi = \frac{\varphi - \varphi_1}{\varphi_2 - \varphi_1}$$

The resulting bilinearly interpolated HRTF filters are:

$H_L(f)=(1-\alpha_\theta)(1-\alpha_\varphi)H_{\theta_1,\varphi_1,L}(f)+(1-\alpha_\theta)\alpha_\varphi H_{\theta_1,\varphi_2,L}(f)+\alpha_\theta(1-\alpha_\varphi)H_{\theta_2,\varphi_1,L}(f)+\alpha_\theta\alpha_\varphi H_{\theta_2,\varphi_2,L}(f)$ $H_R(f)=(1-\alpha_\theta)(1-\alpha_\varphi)H_{\theta_1,\varphi_1,R}(f)+(1-\alpha_\theta)\alpha_\varphi H_{\theta_1,\varphi_2,R}(f)+\alpha_\theta(1-\alpha_\varphi)H_{\theta_2,\varphi_1,R}(f)+\alpha_\theta\alpha_\varphi H_{\theta_2,\varphi_2,R}(f)$ The quality of such calculation results depends on resolution of the filter database. For example, if many filter points are defined in the azimuth dimension, the resulting interpolated values will have high resolution in the azimuth dimension. But suppose the filter database defines fewer points in the elevation dimension. The resulting interpolation values will accordingly have worse resolution in the elevation dimension, which may cause perceivable artifacts based on time delays between adjacent HRTF filters (see below).

Figure 8:
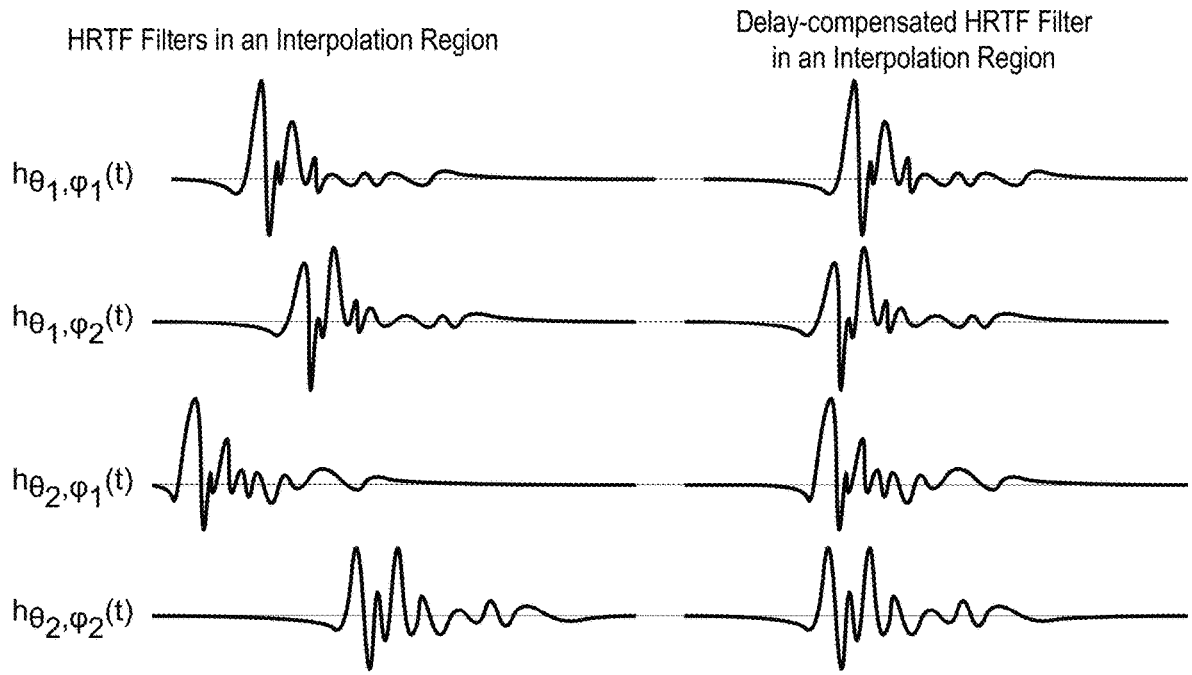
FIG. 8 illustrates desired time-alignment between HRTF filters.

The bilinear interpolation technique described above nevertheless can cause a problem. ITDs are one of the critical perceptual cues captured and reproduced by HRTF filters, thus time delays between filters are commonly observed. Summing time delayed signals can be problematic, causing artifacts such as comb-filtering and cancellations. If the time delay between adjacent HRTF filters is large, the quality of interpolation between those filters will be significantly degraded. The left-hand side of FIG. 8 shows such example time delays between the four filters defined at the respective four corners of a bilinear region. Because of their different timing, the values of the four filters shown when combined through interpolation will result in a "smeared" waveform having components that can interfere with one another constructively or destructively in dependence on frequency. This creates undesirable frequency-dependent audible artifacts that reduces the fidelity and realism of the system. For example, the perceivable comb-filtering effects can be heard to vary or modulate the amplitude up and down for different frequencies in the signal as the sound object position moves between filter locations in FIG. 7.

Figure 13A:
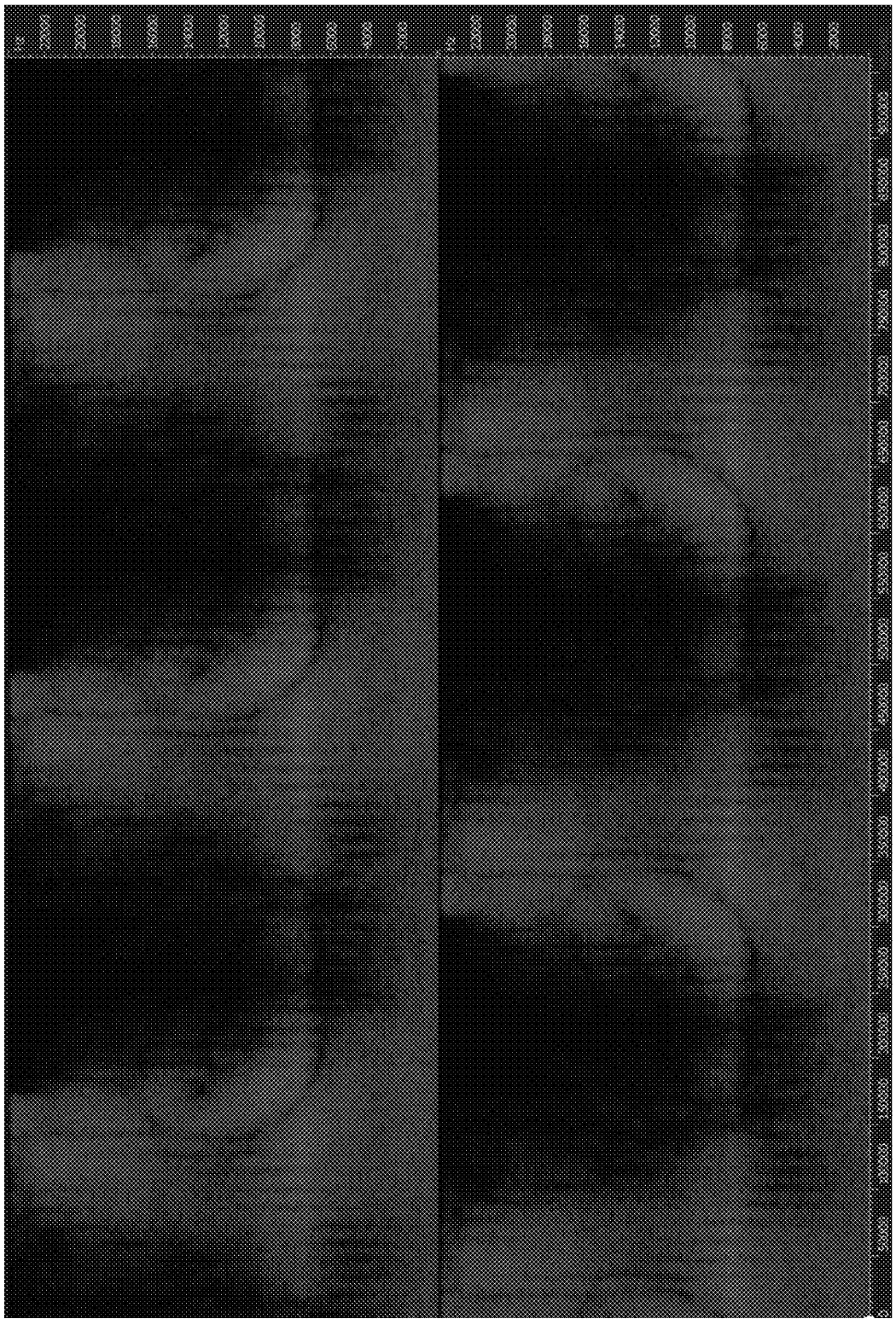
FIGS. 13A and 13B show frequency domain comparisons, with FIG. 13A showing a frequency domain spectrogram without delay compensation and FIG. 13B showing a frequency domain spectrogram with delay compensation.
Figure 14A:
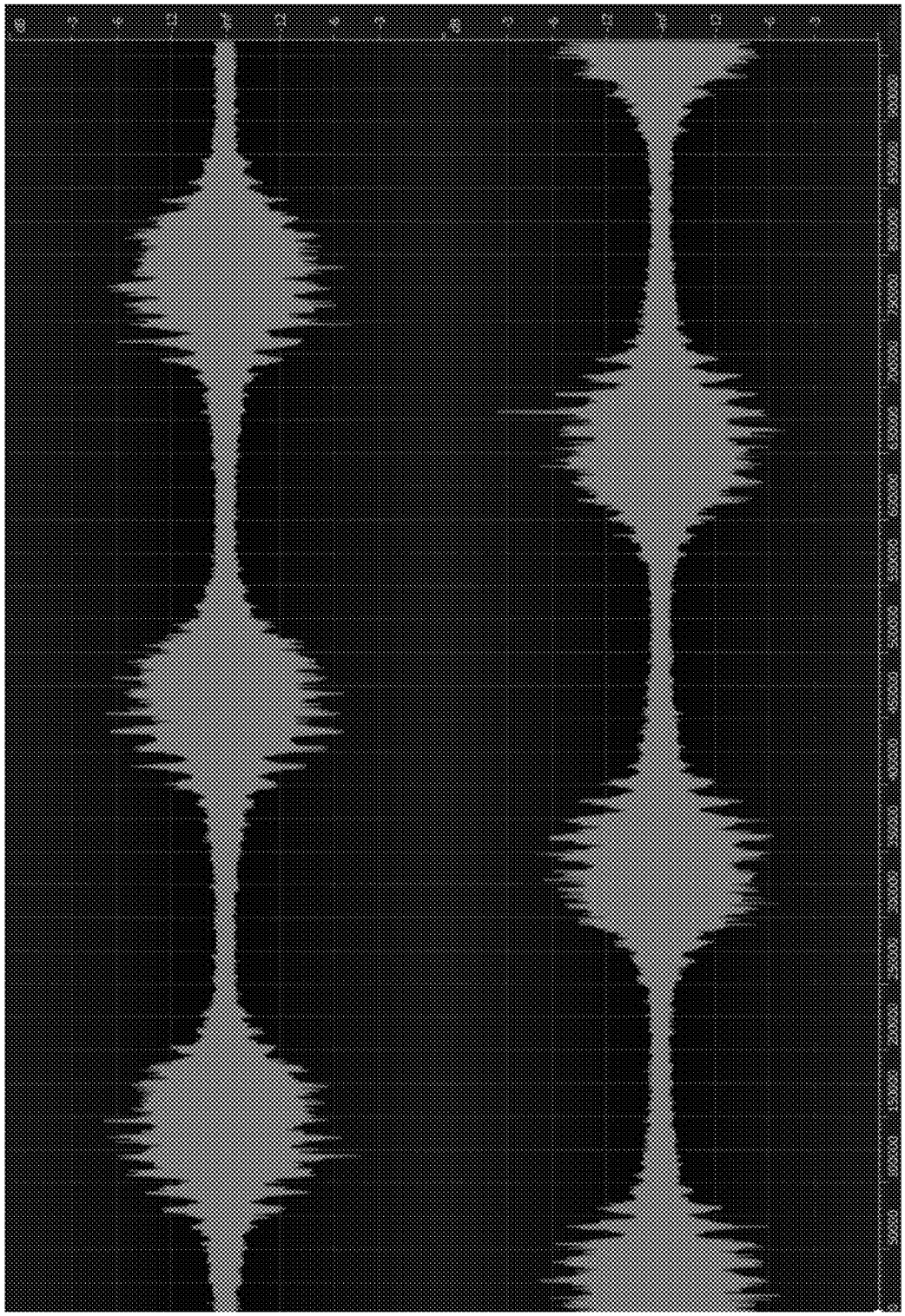
FIGS. 14A and 14B show a time domain comparison, with FIG. 14A showing a time domain plot without delay compensation and FIG. 14B showing a time domain plot with delay compensation.

FIG. 14A shows such comb filtering effects in the time domain signal waveform, and FIG. 13A shows such comb filtering effects in the frequency domain spectrogram. These diagrams show audible modulation artifacts as the sound object moves from a position that is perfectly aligned with a filter location to a position that is (e.g., equidistant) between plural filter locations. Note the striping effects in the FIG. 13A spectrogram, and the corresponding peaks in the FIG. 14A time domain signal. Significant artifacts can thus be heard and seen with standard bilinear interpolation, emphasized by the relatively low 15 degree elevation angular resolution of the HRTF database in one example.

A Better Way: Delay-Compensated Bilinear Interpolation

To address the problem of interpolating between time delayed HRTF filters, a new technique has been developed that is referred to as delay-compensated bilinear interpolation. The idea behind delay-compensated bilinear interpolation is to time-align the HRTF filters prior to interpolation such that summation artifacts are largely avoided, and then time-shift the interpolated result back to a desired temporal position. In other words, even though the HRTF filtering is designed to provide precise amounts of time delays to create spatial effects that differ from one filter position to another, one example implementation makes the time delays "all the same" for the four filters being interpolated, performs the interpolation, and then after interpolation occurs, further time-shifts the result to restore the timing information that was removed for interpolation.

An illustration of the desired time-alignment between HRTF filters is shown in FIG. 8. In particular, the left-hand side of FIG. 8 depicts original HRTF filter as stored in the HRTF database, and the right-hand side of FIG. 8 depicts the same filters after selective time-shifts have been applied to delay-compensate the HRTF filters in an interpolation region.

Time-shifts can be efficiently realized in the frequency-domain by multiplying HRTF filters with appropriate complex exponentials. For example, $$H(k)e^{-\frac{i2\pi}{N}km}$$

will apply a time-shift of m samples to the filter H(k), where N is the FFT length. Note that the general frequency index f has been replaced with the discrete frequency bin index k. Also note that the time-shift m can be a fractional sample amount.

Figure 9:
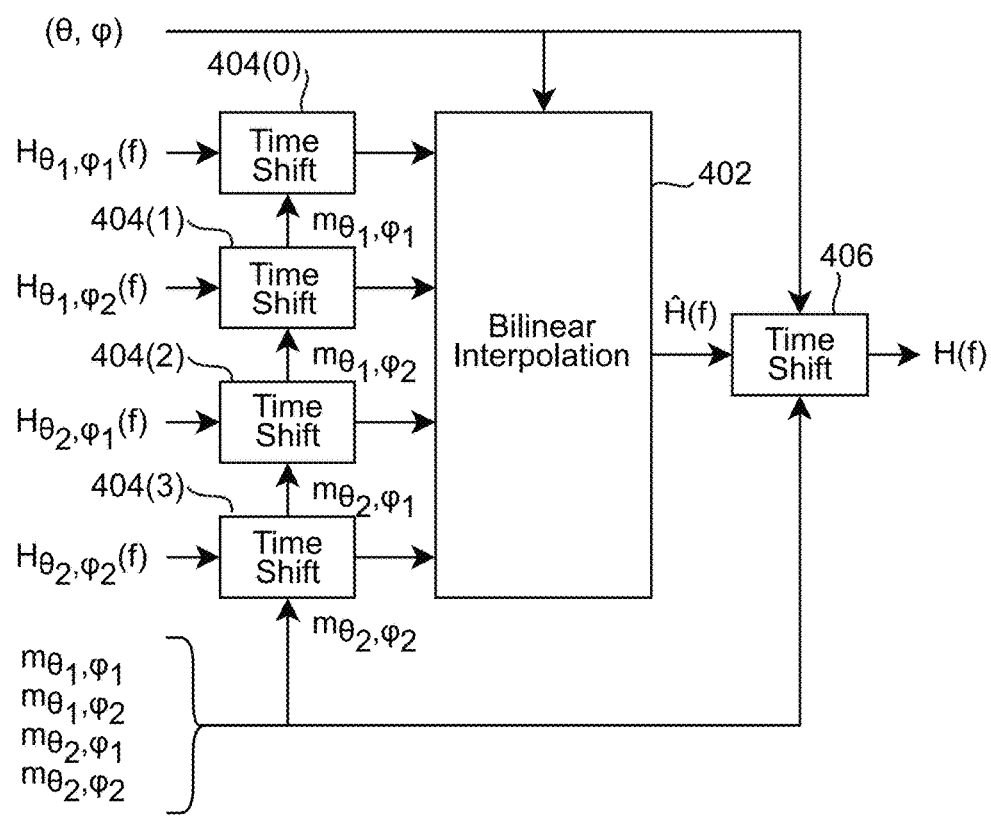
FIG. 9 shows an example block diagram of an example delay-compensated bilinear interpolation technique.

FIG. 9 is a block diagram of an example delay-compensated bilinear interpolation technique. The technique applies appropriate time-shifts 404 to each of the four HRTF filters, then applies standard bilinear interpolation 402, then applies a post-interpolation time-shift 406. Note that the pre-interpolation time-shifts 404 are independent of the desired direction (θ, φ) within the interpolation region, while the bilinear interpolation 402 and post-interpolation time-shift 406 are dependent on (θ, φ). In some embodiments it may not be necessary to time-shift all four filters—for example one of the filters could remain temporally static and the three (or some other number of) other filters could be time-shifted relative to the temporally static filter. In other embodiments, all four (or other number of) HRTF filters may be time-shifted as shown in FIG. 9.

Delay-compensated bilinearly interpolated filters can be calculated as follows (the bilinear interpolation calculation is the same as in the previous example except that multiplication with a complex exponential sequence is added to every filter):

$$\tilde{H}_L(k) = (1-\alpha_\theta)(1-\alpha_\varphi)H_{\theta_1,\varphi_1,L}(k)e^{-\frac{i2\pi}{N}km_{\theta_1,\varphi_1,L}} +$$

$$(1-\alpha_\theta)\alpha_\varphi H_{\theta_1,\varphi_2,L}(k)e^{-\frac{i2\pi}{N}km_{\theta_1,\varphi_2,L}} +$$

$$\alpha_\theta(1-\alpha_\varphi)H_{\theta_2,\varphi_1,L}(k)e^{-\frac{i2\pi}{N}km_{\theta_2,\varphi_1,L}} + \alpha_\theta\alpha_\varphi H_{\theta_2,\varphi_2,L}(k)e^{-\frac{i2\pi}{N}km_{\theta_2,\varphi_2,L}}$$

$$\tilde{H}_R(k) = (1-\alpha_\theta)(1-\alpha_\varphi)H_{\theta_1,\varphi_1,R}(k)e^{-\frac{i2\pi}{N}km_{\theta_1,\varphi_1,R}} +$$

$$(1-\alpha_\theta)\alpha_\varphi H_{\theta_1,\varphi_2,R}(k)e^{-\frac{i2\pi}{N}km_{\theta_1,\varphi_2,R}} +$$

$$\alpha_\theta(1-\alpha_\varphi)H_{\theta_2,\varphi_1,R}(k)e^{-\frac{i2\pi}{N}km_{\theta_2,\varphi_1,R}} + \alpha_\theta\alpha_\varphi H_{\theta_2,\varphi_2,R}(k)e^{-\frac{i2\pi}{N}km_{\theta_2,\varphi_2,R}}$$

The complex exponential term mathematically defines the time shift, with a different time shift being applied to each of the four weighted filter terms. One embodiment calculates such complex exponential sequences in real time. Another embodiment stores precalculated complex exponential sequences in an indexed lookup table and accesses (reads) the precalculated complex exponential sequences or values indicative or derived therefrom from the table.

Efficient Time-Shift for Delay-Compensated Bilinear Interpolation

Performing time-shifts for delay-compensated bilinear interpolation requires multiplying HRTF filters by complex exponential sequences $$e^{-\frac{i2\pi}{N}km},$$

where m is the desired fractional time-shift amount. Calculating complex exponential sequences during run-time can be expensive, while storing pre-calculated tables would require significant additional memory requirements. Another option could be to use fast approximations instead of calling more expensive standard library functions.

The solution used in the current implementation is to exploit the recurrence relation of cosine and sine functions. The recurrence relation for a cosine or sine sequence can be written as $$x[n]=2\cos(\alpha)x[n-1]-x[n-2]$$

where α represents the frequency of the sequence. Thus, to generate our desired complex exponential sequence $$s[k] = e^{-\frac{i2\pi}{N}km},$$

the following equation can be used $$s[k] = 2\cos\left(-\frac{2\pi}{N}m\right)\text{Re}(s[k-1]) - \text{Re}(s[k-2]) +$$

$$i\left(2\cos\left(-\frac{2\pi}{N}m\right)\text{Im}(s[k-1]) - \text{Im}(s[k-2])\right)$$

with initial conditions $$s[0] = 1$$

$$s[1] = 2\cos\left(-\frac{2\pi}{N}m\right) + i2\sin\left(-\frac{2\pi}{N}m\right)$$

Since the term $$\cos\left(-\frac{2\pi}{N}m\right)$$

is constant, it can be pre-calculated once and all remaining values in the sequence can be calculated with just a few multiplies and additions per value (ignoring initial conditions).

Determination of Time-Shifts

Delay-compensated bilinear interpolation 402 applies time-shifts to HRTF filters in order to achieve time-alignment prior to interpolation. The question then arises what time-shift values should be used to provide the desired alignment. In one embodiment, suitable time-shifts $m_{\theta_i,\varphi_j}$ can be pre-calculated for each interpolation region using offline or online analysis. In other embodiments, the time shifts can be determined dynamically in real time. The analysis performed for one example current implementation uses so-called fractional cross-correlation analysis. This fractional cross-correlation technique is similar to standard cross-correlation, but includes fractional-sample lags. The fractional lag with the maximum cross-correlation is used to derive time-shifts that can provide suitable time-alignment. A look-up table of pre-calculated time-shifts $m_{\theta_i,\varphi_j}$ for each interpolation region may be included in the implementation and used during runtime for each interpolation calculation. Such table can be stored in firmware or other non-volatile memory and accessed on demand. Other implementations can use combinatorial or other logic to generate appropriate values.

With appropriately chosen values for all $m_{\theta_i,\varphi_j}$ (see below), time delays between HRTF filters can be compensated and all HRTF filters can be effectively time-aligned prior to interpolation. See the right-hand side of FIG. 8. However, it is desirable for the resulting time delays of the interpolated filters to transition smoothly across the interpolation region and approach the unmodified filter responses when the desired direction is perfectly aligned with an interpolation corner point ($\theta_i$, $\varphi_j$). Thus, the interpolated filters can be time-shifted again by an interpolated amount based on the amounts of the original time shifts $m_{\theta_1,\varphi_1}$, $m_{\theta_1,\varphi_2}$, $m_{\theta_2,\varphi_2}$:

$$H_L(k) = \hat{H}_L(k)e^{-\frac{j2\pi}{N}km_L}$$

$$H_R(k) = \hat{H}_R(k)e^{-\frac{j2\pi}{N}km_R}$$

where $m_L = (1-\alpha_\theta)(1-\alpha_\varphi)(-m_{\theta_1,\varphi_1,L}) + (1-\alpha_\theta)\alpha_\varphi(-m_{\theta_1,\varphi_2,L}) + \alpha_\theta(1-\alpha_\varphi)(-m_{\theta_2,\varphi_1,L}) + \alpha_\theta\alpha_\varphi(-m_{\theta_2,\varphi_2,L})$ $m_R = (1-\alpha_\theta)(1-\alpha_\varphi)(-m_{\theta_1,\varphi_1,R}) + (1-\alpha_\theta)\alpha_\varphi(-m_{\theta_1,\varphi_2,R}) + \alpha_\theta(1-\alpha_\varphi)(-m_{\theta_2,\varphi_1,R}) + \alpha_\theta\alpha_\varphi(-m_{\theta_2,\varphi_2,R})$ This post-interpolation time-shift 406 is in the opposite direction as the original time-shifts 404 applied to HRTF filters. This allows achievement of an unmodified response when the desired direction is perfectly spatially aligned with an interpolation corner point. The additional time shift 406 thus restores the timing to an unmodified state to prevent timing discontinuities when moving away from nearly exact alignment with a particular filter.

An overall result of the delay-compensated bilinear interpolation technique is that filters can be effectively time-aligned during interpolation to help avoid summation artifacts, while smoothly transitioning time delays over the interpolation region and achieving unmodified responses at the extreme interpolation corner points.

Effectiveness of Delay-Compensated Bilinear Interpolation

Figure 13B:
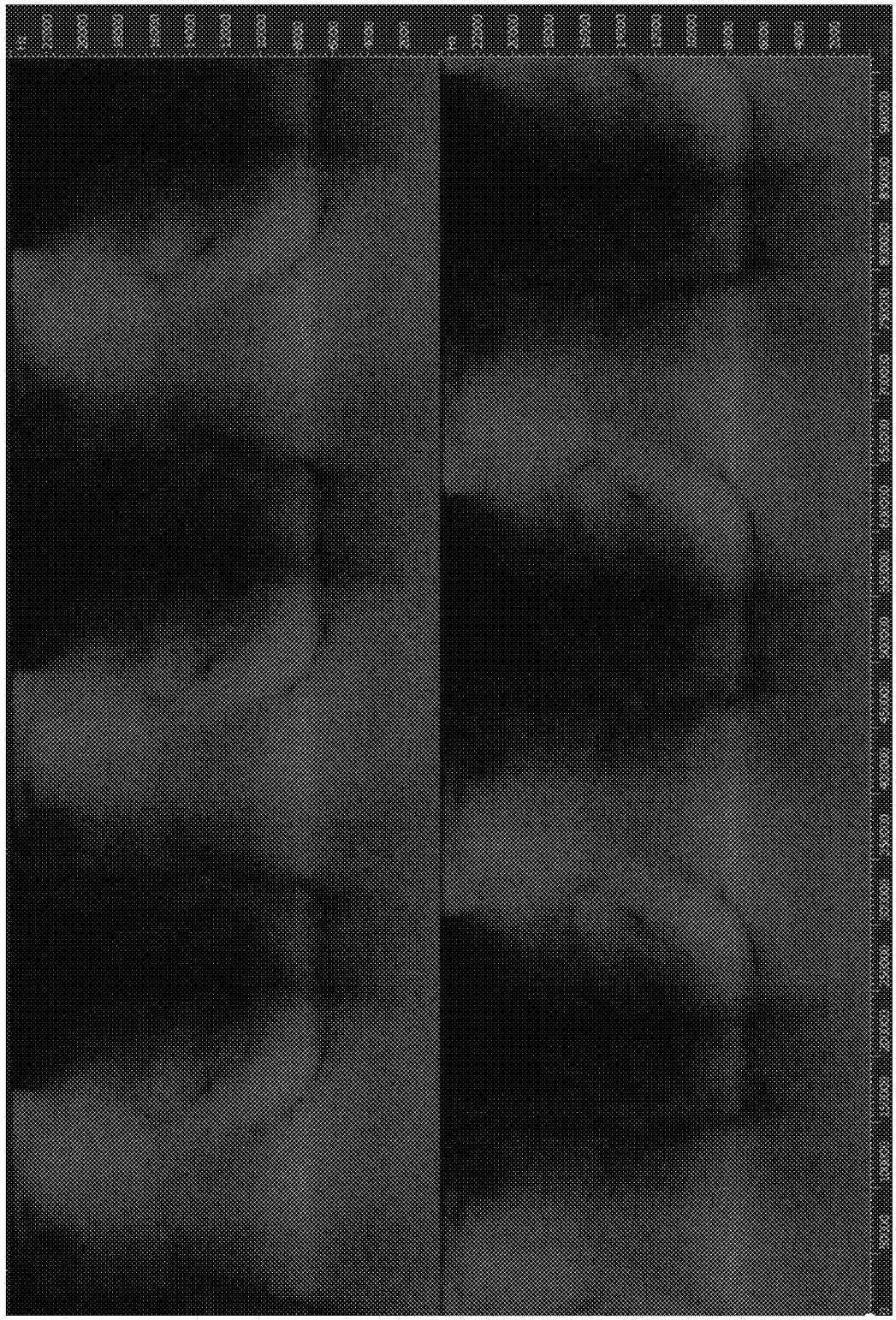
Figure 14B:
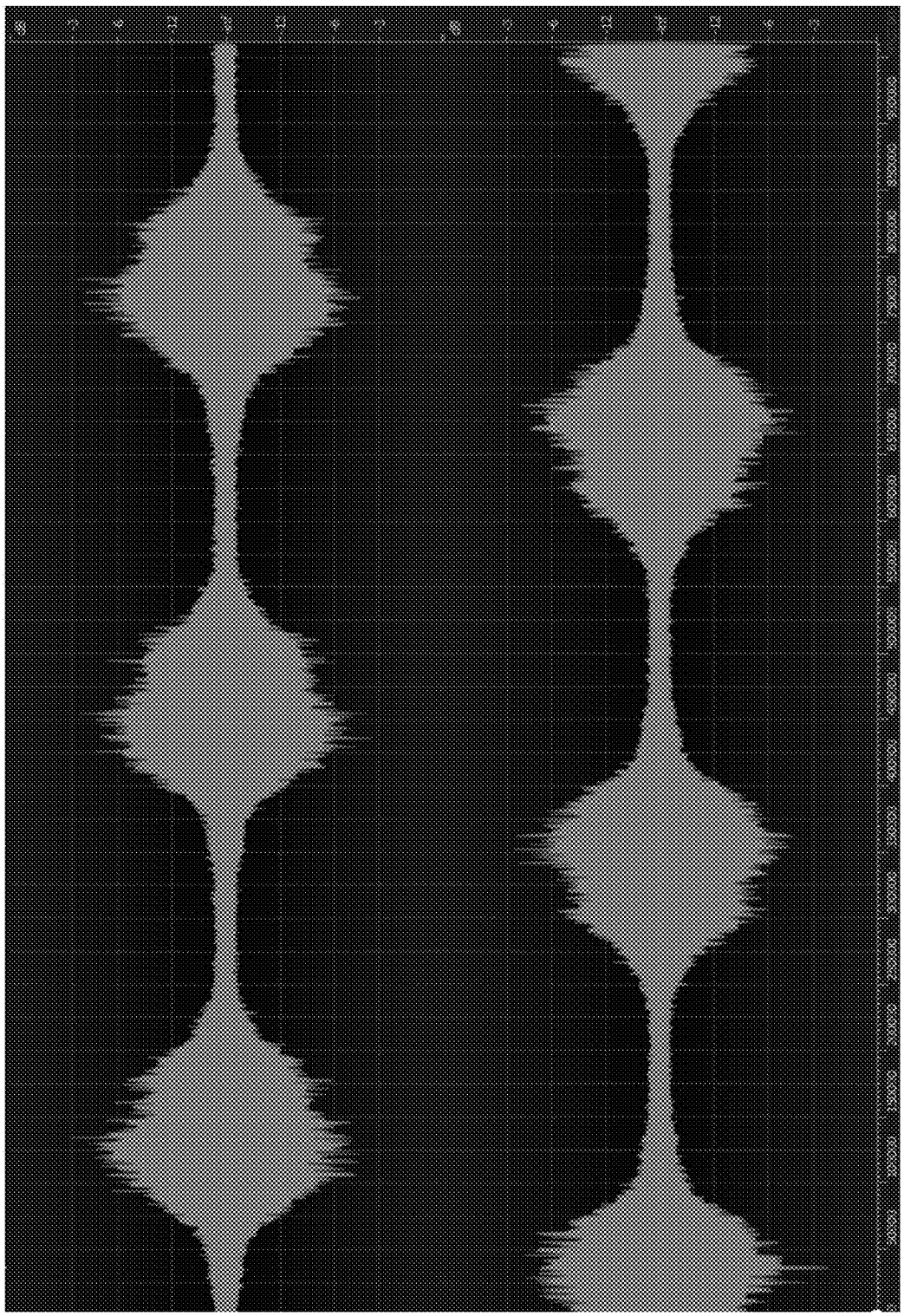

An object that rotates around a listener's head in the frontal plane has been observed as a good demonstration of the effectiveness of the delay-compensated bilinear interpolation technique. FIGS. 13A, 13B, 14A, 14B show example results of a white noise object rotating around a listener's head in the frontal plane when using both standard bilinear interpolation and delay-compensated bilinear interpolation techniques. FIGS. 13B, 14B show example results using delay-compensated bilinear interpolation with significantly smoother or less "striped" signals that reduce or eliminate the comb filtering effects described above. Artifacts are thus substantially avoided when using the delay-compensated bilinear interpolation.

Architecture with Cross-Fade

Time-varying HRTF FIR filters of the type discussed above are thus parameterized with a parameter(s) that represents relative position and/or distance and/or direction between a sound generating object and a listener. In other words, when the parameter(s) that represents relative position and/or distance and/or direction between a sound generating object and a listener changes (e.g., due to change of position of the sound generating object, the listener or both), the filter characteristics of the time-varying HRTF filters change. Such change in filter characteristics is known to cause processing artifacts if not properly handled. See e.g., Keyrouz et al., "A New HRTF Interpolation Approach for Fast Synthesis of Dynamic Environmental Interaction", JAES Volume 56 Issue 1/2 pp. 28-35; January 2008, Permalink: http://www.aes.org/e-lib/browse.cfm?elib=14373; Keyrouz et al., "A Rational HRTF Interpolation Approach for Fast Synthesis of Moving Sound", 2006 IEEE 12th Digital Signal Processing Workshop & 4th IEEE Signal Processing Education Workshop, 24-27 Sep.. 2006 DOI: 10.1109/DSPWS.2006.265411.

Figure 10:
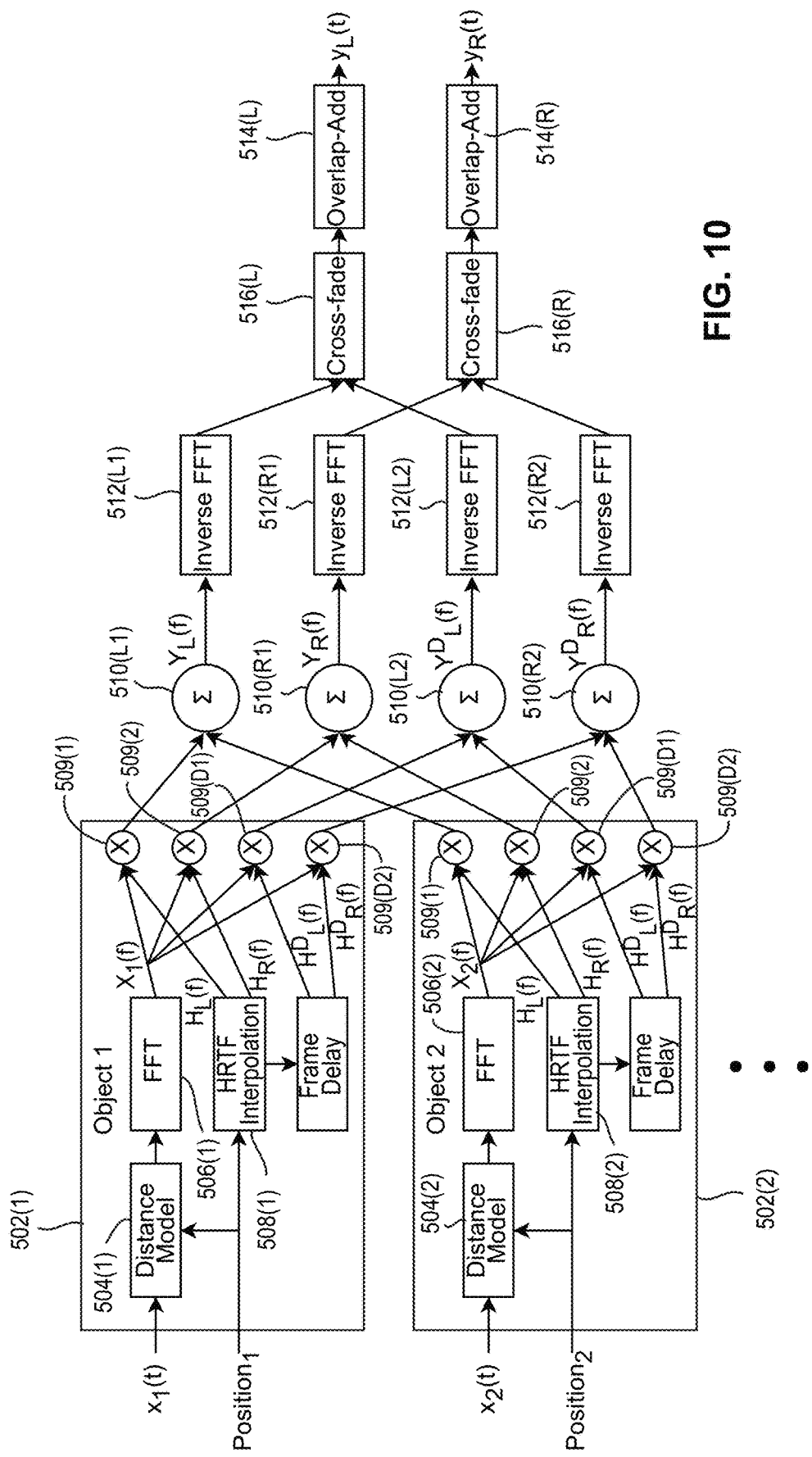
FIG. 10 is a block diagram of an example modified architecture that uses cross-fading.

To mitigate artifacts from time-varying FIR filters, an example embodiment provides a modified architecture that utilizes cross-fading between filter results as shown in the FIG. 10 block diagram. In one embodiment, all of the processing blocks are the same as described in previous sections, however the architecture is modified to produce two sets of binaural stereo channels for each frame. However, in other embodiments, the two binaural stereo signals could be produced in any desired manner (e.g., not necessarily using the FIG. 9 time-shift bilinear interpolation architecture) and cross-fading as described below can be applied to provide smooth transitions from one HRTF filter to the next. In other words, the FIG. 10 cross-faders 516 solve a different discontinuity problem than the one solved by the FIG. 9 arrangement, namely, to mitigate discontinuities obtained by convoluting the results of two very different HRTF filter transformations based on the sound object (or the listener, or both) changing position rapidly from one frame to the next. This is an independent problem from the one addressed using time shifts described above, and one technique does not necessarily rely on the other and each technique could be used in respective implementations without the other. Nevertheless, the two techniques can be advantageously used together in a common implementation to avoid both types of discontinuities and associated perceivable artifacts.

Frame Delay

The FIG. 10 cross-fade architecture includes a frame delay for the HRTF filters. This results in four HRTF filters per object: $H_L(f)$ and $H_R(f)$ that are selected based on the current object position, and $H_L^D(f)$ and $H_R^D(f)$ that are the delayed filters from a previous frame based on a previous object position. In one embodiment, the previous frame may be the immediately preceding frame. In other embodiments, the previous frame may be a previous frame other than the immediately preceding frame.

All four HRTF filters are used to filter the current sound signal produced in the current frame (i.e., in one embodiment, this is not a case in which the filtering results of the previous frame can be stored and reused—rather, in such embodiment, the current sound signal for the current frame is filtered using two left-side HRTF filters and two right-side HRTF filters, with one pair of left-side/right-side HRTF filters being selected or determined based on the current position of the sound object and/or current direction between the sound object and the listener, and the other pair of left-side/right-side HRTF filters being the same filters used in a previous frame time). Another way of looking at it: In a given frame time, the HRTF filters or parameterized filter settings selected for that frame time will be reused in a next or successive frame time to mitigate artifacts caused by changing the HRFT filters from the given frame time to the next or successive frame time. In the example shown, such arrangement is extended across all sound objects including their HRTF filter interpolations, HRTF filtering operations, multi-object signal summation/mixing, and inverse FFT from the frequency domain into the time domain.

Adding frame delayed filters results in identical HRTF filters being applied for two consecutive frames, where the overlap-add regions for those outputs are guaranteed to be artifact-free. This architecture provides suitable overlapping frames (see FIG. 11) that can be cross-faded together to provide smooth transitions. In this context, the term "frame" may comprise or mean a portion of an audio signal stream that includes at least one audio sample, such as a portion comprised of N audio samples. For example, there can be a plurality of audio "frames" associated with a $\frac{1}{60}^{th}$ or $\frac{1}{30}^{th}$ of a second duration video frame, each audio frame comprising a number of audio samples to be processed. As explained above, in example embodiment, the system does not store and reuse previous filtered outputs or results, but instead applies the parameterized filtering operation of a previous filtering operation (e.g., based on a previous and now changed relative position between a sound generating object and a listener) to new incoming or current audio data. However, in other embodiments the system could use both previous filtering operation results and previous filtering operation parameters to develop current or new audio processing outputs. Thus, applicant does not intend to disclaim the use of previously generated filter results for various purposes such as known by those skilled in the art.

Cross-Fade 516

Each cross-fader 516 (which operates in the time domain after an associated inverse FFT block) accepts two filtered signals $\hat{y}(t)$ and $\widehat{y^D}$ (t). A rising cross-fade window w(t) is applied to the signal $\hat{y}(t)$, while a falling cross-fade window $w^D(t)$ is applied to the signal $\widehat{y^D}$ (t). In one embodiment, the cross-fader 516 may comprise an audio mixing function that increases the gain of a first input while decreasing the gain of a second input. A simple example of a cross-fader is a left-right stereo "balance" control, which increases the amplitude of a left channel stereo signal while decreasing the amplitude of a right channel stereo signal. In certain embodiments, the gains of the cross-fader are designed to sum to unity (i.e., amplitude-preserving), while in other embodiments the square of the gains are designed to sum to unity (i.e., energy-preserving). In the past, such cross-fader functionality was sometimes provided in manual form as a knob or slider of a "mixing board" to "segue" between two different audio inputs, e.g., so that the end of one song from one turntable, tape, or disk player blended in seamlessly with the beginning of the next song from another turntable, tape, or disk player. In certain embodiments, the cross-fader is an automatic control operated by a processor under software control, which provides cross-fading between two different HRTF filter operations across an entire set of sound objects.

In one embodiment, the cross-fader 516 comprises dual gain controls (e.g., multipliers) and a mixer (summer) controlled by the processor, the dual gain controls increasing the gain of one input by a certain amount and simultaneously decreasing the gain of another input by said certain amount. In one example embodiment, the cross-fader 516 operates on a single stereo channel (e.g., one cross-fader for the left channel, another cross-fader for the right channel) and mixes variable amounts of two inputs into that channel. The gain functions of the respective inputs need not be linear—for example the amount by which the cross-fader increases the gain of one input need not match the amount which the cross-fader decreases the gain of another input. In one embodiment, the gain functions of the two gain elements $G_1$, $G_2$ can be $G_1=0$, $G_2=x$ at one setting used at the beginning of (or an early portion of) a frame, and $G_1=y$, $G_2=0$ at a second setting used at the end of (or a later portion of) the frame, and can provide intermediate mixing values between those two time instants such that some amount of the $G_1$ signal and some amount of the $G_2$ signal are mixed together during the frame.

Figure 12:
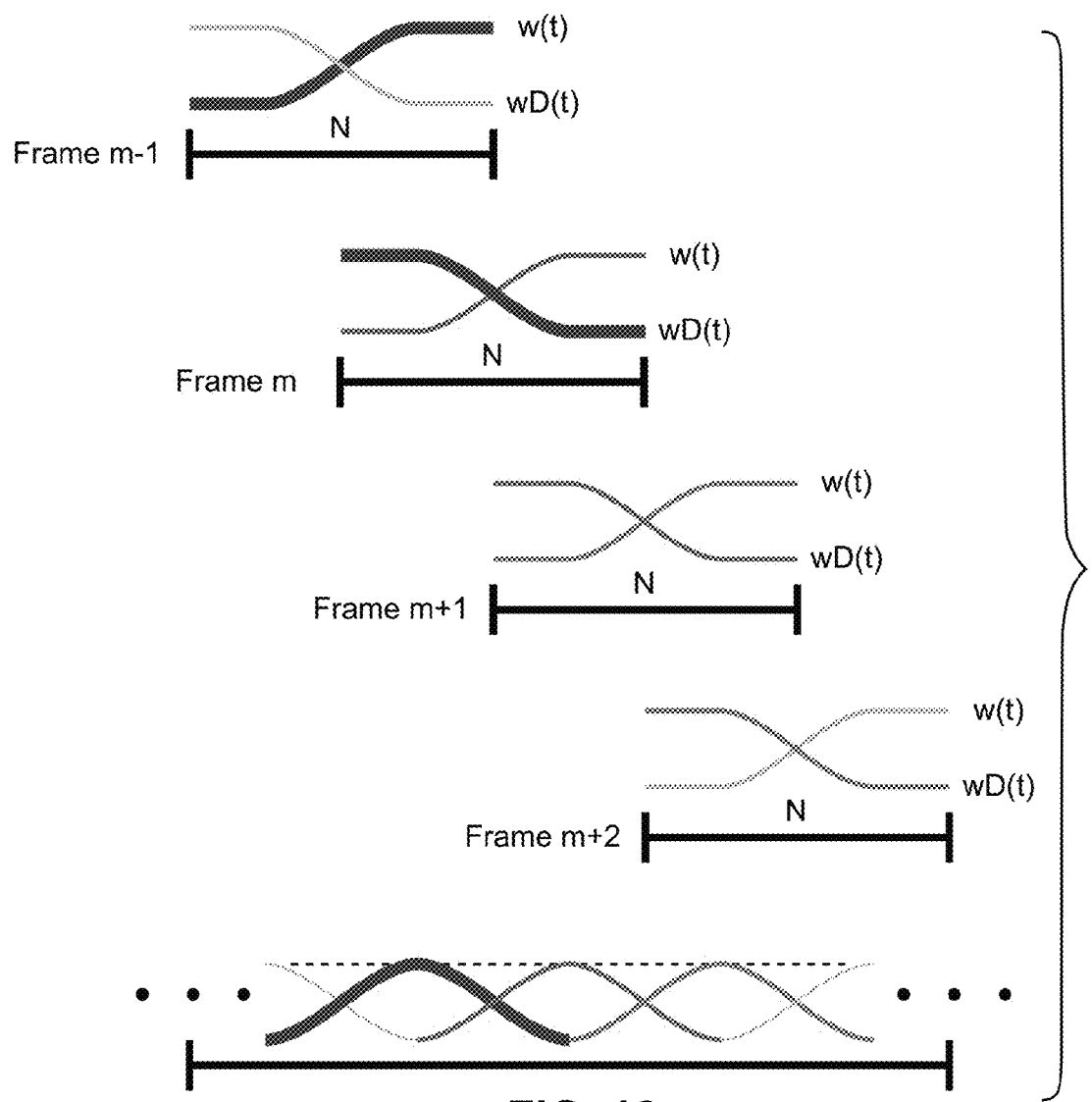
FIG. 12 shows frame time windows with cross-fade.

In one embodiment, the output of each cross-fader 516 is thus at the beginning (or a first or early portion) of the frame, fully the result of the frame-delayed filtering, and is thus at the end of (or a second or later portion of) the frame, fully the result of the current (non-frame delayed) filtering. In this way, because one interpolation block produces the result of the previous frame's filtering value while another interpolation block produces the result of the current frame's filtering value, there is no discontinuity at the beginning or the end of frame times even though in between these two end points, the cross-fader 516 produces a mixture of those two values, with the mixture starting out as entirely and then mostly the result of frame-delayed filtering and ending as mostly and then entirely the result of non-frame delayed (current) filtering. This is illustrated in FIG. 12 with the "Red" (thick solid), "Blue" (dashed) and "Green" (thin solid) traces. Since the signal $\widehat{y^D}$ (t) results from an HRTF filter that was previously applied in the prior frame, the resulting overlap-add region is guaranteed to be artifact-free (there will be no discontinuities even if the filtering functions are different from one another from frame to frame due to fast moving objects) and provides suitable cross-fading with adjacent frames.

The windows w(n) and $w^D(n)$ (using discrete time index n) of length N are defined as $$w(n) = \begin{cases} 0, & \text{if } n \leq \frac{N}{4} \\ \sin^2\left(\pi\frac{n - \frac{N}{4} + 0.5}{N}\right), & \text{if } \frac{N}{4} < n \leq \frac{3N}{4} \\ 1, & \text{if } n > \frac{3N}{4} \end{cases}$$

$$w^D(n) = \begin{cases} 1, & \text{if } n \leq \frac{N}{4} \\ \cos^2\left(\pi\frac{n - \frac{N}{4} + 0.5}{N}\right), & \text{if } \frac{N}{4} < n \leq \frac{3N}{4} \\ 0, & \text{if } n > \frac{3N}{4} \end{cases}$$

In one embodiment, such cross-fading operations as described above are performed for each audio frame. In another embodiment, such cross-fading operations are selectively performed only or primarily when audio artifacts are likely to arise, e.g., when a sound object changes position relative to a listening position to change the filtering parameters such as when a sound generating object and/or the listener changes position including but not limited to by moving between positions.

Example Implementation Details

In one example, the sample rate of the described system may be 24 kHz or 48 KHz or 60 kHz or 99 kHz or any other rate, the frame size may be 128 samples or 256 samples or 512 samples or 1024 samples or any suitable size, and the FFT/IFFT length may be 128 or 256 or 512 or 1024 or any other suitable length and may include zero-padding if the FFT/IFFT length is longer than the frame size. In one example, each sound object may call one forward FFT and a total of 4 inverse FFTs are used for a total of M+4 FFT calls where M is the number of sound objects. This is relatively efficient and allows for a large number of sound objects using standard DSPs of the type many common platforms are equipped with.

Additional Enhancement Features

HRTF Personalization

Head Size and ITD Cues

HRTFs are known to vary significantly from person-to-person. ITDs are one of the most important localization cues and are largely dependent on head size and shape. Ensuring accurate ITD cues can substantially improve spatialization quality for some listeners. Adjusting ITDs could be performed in the current architecture of the object-based spatializer. In one embodiment, ITD adjustments can be realized by multiplying frequency domain HRTF filters by complex exponential sequences. Optimal ITD adjustments could be derived from head size estimates or an interactive GUI. A camera-based head size estimation technology could be used. Sampling by placing microphones in a given listener's left and right ears can be used to modify or customize the HRTF for that listener.

Head-Tracking

Head-tracking can be used to enhance the realism of virtual sound objects. Gyroscopes, accelerometers, cameras or some other sensors might be used. See for example U.S. Pat. No. 10,449,444. In virtual reality systems that track a listener's head position and orientation (posture) using MARG or other technology, head tracking information can be used to increase the accuracy of the HRTF filter modelling.

Crosstalk Cancellation

While binaural stereo audio is intended for playback over headphones, crosstalk cancellation is a technique that can allow for binaural audio to playback over stereo speakers. A crosstalk cancellation algorithm can be used in combination with binaural spatialization techniques to create a compelling experience for stereo speaker playback.

Use of Head Related Transfer Function

In certain exemplary embodiments, head-related transfer functions are used, thereby simulating 3D audio effects to generate sounds to be output from the sound output apparatus. It should be noted that sounds may be generated based on a function for assuming and calculating sounds that come from the sound objects to the left ear and the right ear of the listener at a predetermined listening position. Alternatively, sounds may be generated using a function other than the head-related transfer function, thereby providing a sense of localization of sounds to the listener listening to the sounds. For example, 3D audio effects may be simulated using another method for obtaining effects similar to those of the binaural method, such as a holophonics method or an otophonics method. Further, in the 3D audio effect technology using the head-related transfer function in the above exemplary embodiments, the sound pressure levels are controlled in accordance with frequencies until the sounds reach the eardrums from the sound objects, and the sound pressure levels are controlled also based on the locations (e.g., the azimuth orientations) where the sound objects are placed. Alternatively, sounds may be generated using either type of control. That is, sounds to be output from the sound output apparatus may be generated using only a function for controlling the sound pressure levels in accordance with frequencies until the sounds reach the eardrums from the sound objects, or sounds to be output from the sound output apparatus may be generated using only a function for controlling the sound pressure levels also based on the locations (e.g., the azimuth orientations) where the sound objects are placed. Yet alternatively, sounds to be output from the sound output apparatus may be generated using, as well as these functions, only a function for controlling the sound pressure levels using at least one of the difference in sound volume, the difference in transfer time, the change in the phase, the change in the reverberation, and the like corresponding to the locations (e.g., the azimuth orientations) where the sound objects are placed. Yet alternatively, as an example where a function other than the head-related transfer function is used, 3D audio effects may be simulated using a function for changing the sound pressure levels in accordance with the distances from the positions where the sound objects are placed to the listener. Yet alternatively, 3D audio effects may be simulated using a function for changing the sound pressure levels in accordance with at least one of the atmospheric pressure, the humidity, the temperature, and the like in real space where the listener is operating an information processing apparatus.

In addition, if the binaural method is used, sounds to be output from the sound output apparatus may be generated using peripheral sounds recorded through microphones built into a dummy head representing the head of a listener, or microphones attached to the inside of the ears of a person. In this case, the states of sounds reaching the eardrums of the listener are recorded using structures similar to those of the skull and the auditory organs of the listener, or the skull and the auditory organs per se, whereby it is possible to similarly provide a sense of localization of sounds to the listener listening to the sounds.

In addition, the sound output apparatus may not be headphones or earphones for outputting sounds directly to the ears of the listener, and may be stationary loudspeakers for outputting sounds to real space. For example, if stationary loudspeakers, monitors, or the like, are used as the sound output apparatus, a plurality of such output devices can be placed in front of and/or around the listener, and sounds can be output from the respective devices. As a first example, if a pair of loudspeakers (so-called two-channel loudspeakers) is placed in front of and on the left and right of the listener, sounds generated by a general stereo method can be output from the loudspeakers. As a second example, if five loudspeakers (so-called five-channel loudspeakers or "surround sound") are placed in front and back of and on the left and right of the listener (as well as in the center), stereo sounds generated by a surround method can be output from the loudspeakers. As a third example, if multiple loudspeakers (e.g., 22.2 multi-channel loudspeakers) are placed in front and back of, on the left and right of, and above and below the listener, stereo sounds using a multi-channel acoustic system can be output from the loudspeakers. As a fourth example, sounds generated by the above binaural method can be output from the loudspeakers using binaural loudspeakers. In any of the examples, sounds can be localized in front and back of, on the left and right of, and/or above and below the listener. This makes it possible to shift the localization position of the vibrations using the localization position of the sounds. See U.S. Pat. No. 10,796,540 incorporated herein by reference.

While the description herein relies on certain operations (e.g., fractional time shifting) in the frequency domain, it would be possible to perform the same or similar operations in the time domain. And while the description herein relies on certain operations (e.g., cross-fading) in the time domain, it would be possible to perform the same or similar operations in the frequency domain. Similarly, implementations herein are DSP based in software, but some or all of the operations could be formed in hardware or in a combination of hardware and software.

All patents, patent applications, and publications cited herein are incorporated by reference for all purposes as if expressly set forth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for filtering sound signals with time-varying FIR filters, comprising performing with at least one processor, operations comprising:
    obtaining or deriving a first parameter value based on a first location in a virtual space of a virtual sound source that moves in the virtual space between the first location and a second location;
    obtaining or deriving a second parameter value based on the second location of the virtual sound source in the virtual space;
    applying a first filtering operation using the first parameter value to a sound signal of the virtual sound source to produce a first filtered output;
    applying a second filtering operation using the second parameter value to the sound signal of the virtual sound source to produce a second filtered output; and
    removing artifacts due to movement of the virtual sound source from the first location to the second location by cross-fading between the first filtered output and the second filtered output.

2. The method of claim 1 wherein the second parameter value indicates a relative direction and distance between a sound generating virtual object and a listener position, and the first parameter value is from a previous filtering operation and indicates a previous relative direction and distance between the sound generating virtual object and the listener position.

3. The method of claim 1 wherein the first filtering operation and the second filtering operation each comprise head related transfer function FIR filtering.

4. The method of claim 1 wherein the first filtering operation and the second filtering operation each comprise linear filtering.

5. The method of claim 1 wherein the first filtering operation and the second filtering operation each comprise bilinear filtering.

6. The method of claim 1 wherein the sound signal comprises a digital audio signal.

7. The method of claim 1 wherein the first filtering operation is based on a position and/or direction of a current frame time; and the second filtering operation is based on a position and/or direction from a previous frame time.

8. The method of claim 7 wherein the cross-fading includes using the first filter output but not the second filter output in an early portion of an output signal segment, using the second filter output but not the first filter output in a later portion of the output signal segment, and mixing together the first filter output and the second filter output between the early portion of the output signal segment and the later portion of the output signal segment.

9. The method of claim 8 wherein the early portion of the output signal segment comprises a starting portion and the later portion of the output signal segment comprises an ending portion.

10. The method of claim 1 including performing the cross-fading in the time domain.

11. A system for filtering sound signals with time-varying FIR filters, comprising at least one processor configured to perform operations comprising:
    (a) obtaining or deriving a first parameter value based on a first location in a virtual space, of a virtual sound source that moves in the virtual space between the first location and a second location;
    (b) using the first parameter value, applying a first audio FIR filtering operation to a first audio segment to produce a first filtered output of the first audio-segment;
    (c) obtaining or deriving a second parameter value based on the second location in the virtual space, of the virtual sound source;
    (d1) reusing the first parameter value, applying the first audio FIR filtering operation to a second audio segment to produce a first filtered output of the second audio segment, and
    (d2) using the second parameter value, applying a second filtering operation to the second audio segment to produce a second filtered output of the second audio segment; and
    (e) cross-fading between the first filtered output of the second audio segment and second filtered output of the second audio segment.

12. The system of claim 11 wherein the second parameter value indicates a relative direction and distance between a sound generating virtual object and a listener position, and the first parameter value from a previous filtering operation indicates a previous relative direction and distance between the sound generating virtual object and the listener position.

13. The system of claim 11 wherein the first filtering operation and the second filtering operation each comprise head related transfer function FIR filtering.

14. The system of claim 11 wherein the first filtering operation and the second filtering operation each comprise bilinear filtering.

15. The system of claim 11 wherein the first audio segment and the second audio segment comprise segments of a digital audio signal.

16. The system of claim 11 wherein the first filtering operation is based on a position and/or direction in a first frame; and the second filtering operation is based on a position and/or direction from a second frame previous to the first frame.

17. The system of claim 11 wherein the cross-fading includes using the first filter output of the second audio segment but not the second filter output of the second audio segment in an early portion of an output signal segment, using the second filter output of the second audio segment but not the first filter output of the second audio segment in a later portion of the output signal segment, and mixing together the first filter output of the second audio segment and the second filter output of the second audio segment between the early portion and the later portion of the output signal segment.

18. The system of claim 17 wherein the early portion comprises a starting portion and the later portion comprises an ending portion.

19. The system of claim 11 wherein the cross-fading is performed in the time domain.

* * * * *